United States Patent
Nelson

Patent Number: 5,991,475
Date of Patent: Nov. 23, 1999

[54] TIGHTLY CURVED DIGITAL OPTICAL SWITCHES

[75] Inventor: William H. Nelson, Grafton, Mass.

[73] Assignee: GTE Laboratories Incorporated, Waltham, Mass.

[21] Appl. No.: 08/938,165

[22] Filed: Sep. 26, 1997

[51] Int. Cl.$^6$ ..................................................... G02B 6/26

[52] U.S. Cl. .............................. 385/16; 385/31; 385/21; 385/45

[58] Field of Search .................................. 385/16, 14, 15, 385/18, 22, 24, 31, 39, 40, 45, 129, 130, 131, 132; 216/24

[56] References Cited

U.S. PATENT DOCUMENTS

| 4,846,540 | 7/1989 | Kapon | 385/16 |
|---|---|---|---|
| 5,490,226 | 2/1996 | Nelson | 385/16 |
| 5,537,497 | 7/1996 | Nelson | 385/22 |

*Primary Examiner*—Phan T. H. Palmer
*Attorney, Agent, or Firm*—Leonard Charles Suchyta; Floyd E. Anderson

[57] ABSTRACT

An optical index switch including curved ridge waveguides. The cladding around the waveguides is selectively etched to produce tightly curved optical switches.

15 Claims, 5 Drawing Sheets

TIGHTLY CURVED DIGITAL OPTICAL SWITCHES

This invention was made with Government support under Contract No. N0014-93-C-0111. The Government has certain rights in this invention.

BACKGROUND OF THE INVENTION

The present invention relates to digital optical switches. In particular, it relates to tightly curved digital optical switches.

The shift to optical fiber as the preferred transmission medium in telecommunications has created the need for practical optical switches to perform both the routing and distribution functions of the optical network. A type of optical switch is the waveguide spatial switch that selectable transfers an incoming optical signal to a specific one of a plurality of output waveguides. The spatial switch is controlled by an externally applied electrical control signal without regard to the particular spectral or informational content of that signal. This type of optical switch generally functions in one of three modes: (1) as a direct coupler switch, (2) as a gain switch, or (3) as an index switch. A direct coupler switch splits single polarized monochromic light and subsequently recombines it constructively in the desired channel and destructively in the non-desired channel. A gain switch splits the light and subsequently amplifies the light in the desired channel (the amplification compensates for the loss from splitting the light) and absorbs it in the non-desired channel. An optical index switch focuses, or reflects, the optical energy into the desired output channel.

A number of factors, however, limit the performance of these different switches. For example, direct coupler switches are critically dependent on the length of the active interference region for complete switching. They must be fabricated for operation at a particular wavelength and polarization, which eliminates use in a multi-wavelength network or a network in which the polarization varies. Gain switches suffer from the high power requirements. Additionally, gain switches require complex fast optical amplifiers in the output channels, which must be turned on for amplification or off for absorption. Finally, optical switches that depend upon mechanical or thermal mechanisms for switching are too slow for general use in a telecommunication network.

This leaves the optical index switch as the switch of choice for most telecommunication networks. Optical switches can be fabricated to reflect or to focus light by changes in the index of refraction, where the index change is accomplished by either injecting or depleting electrical carriers in the switching region. The depletion mode of operation suffers from polarization sensitivity because the depletion region's large electrical field couples to the material's electro-optic coefficients; however, for polarization insensitive operation, the optical index switch can be operated by injecting electrical carriers.

Conventional optical index switches require electrodes on each output branch to effect index changes so that a propagation tendency in the higher index branch will result due to asymmetric adiabatic modal evolution. However, these index switches require stringent fabrication procedure and tolerances to minimize any coupling between the electrodes, particularly in the interaction region at the wave guide junction. Moreover, index switches require continuous electrical power to remain in a particular switching state.

Solutions to the above problems were provided by U.S. Pat. No. 5,490,226 for ZERO HOLDING POWER DIGITAL OPTICAL SWITCHES and U.S. Pat. No. 5,537,497 for OPTIMIZED ELECTRODE GEOMETRIES FOR DIGITAL OPTICAL SWITCHES, both issued to William H. Nelson, the relevant disclosure of which is set out below. These switches, however, required a large chip in order to achieve the required separation between the terminations that would allow coupling to individual fibers. In order to reduce the length of the switch, current technology requires additional masking and regrowth, or fabrication, to place tightly bound curved waveguides in the switch. The additional masking and regrowth increases the cost and significantly reduces the yield of the optical switch. Therefore, it would be desirable to provide a small chip without the additional masking and regrowth, and the corresponding reduction in yield.

SUMMARY OF THE INVENTION

To attain the advantages and in accordance with the purpose of the invention, as embodied and broadly described herein, an optical switch consistent with the present invention comprises an input branch including a ridge waveguide heterostructure for receiving an optical signal. A first output branch is optically coupled to the input branch at a junction. The first output branch includes a curved ridge waveguide heterostructure of a first refractive index. A second output branch is also optically coupled to the input branch at the junction. The second output branch includes a curved ridge waveguide heterostructure having a forward-biased refractive index, a reversed-biased refractive index, and an un-biased refractive index. An electrode is disposed on the second output branch for altering the refractive index of the second output branch between the forward-biased refractive index, the reversed-biased refractive index, and the un-biased refractive index.

Another optical switch consistent with the present invention comprises a first input branch including a curved ridge waveguide heterostructure for receiving an optical signal having a first forward-biased refractive index, a first reversed-biased refractive index, and a first un-biased refractive index. A second input branch including a curved ridge waveguide heterostructure is optically coupled to the first input branch at a junction. A first output branch is optically coupled to the first input branch at the junction and includes a curved ridge waveguide heterostructure of a second un-biased refractive index. A second output branch is optically coupled to the first input branch at the junction and includes a curved ridge waveguide heterostructure having a second forward-biased refractive index, a second reversed-biased refractive index, and a third un-biased refractive index. A first electrode is disposed on the first input branch for altering the refractive index of the first input branch between the first forward-biased refractive index, the first reversed-biased refractive index, and the un-biased refractive index. A second electrode is disposed on the second output branch for altering the refractive index of the second output between the second forward-biased refractive index, the second reversed-biased refractive index, and the third un-biased refractive index.

BRIEF DESCRIPTION OF THE DRAWINGS

The accompanying drawings, which are incorporated in and constitute a part of this specification, illustrate preferred embodiments of the invention and, together with the description, explain the goals, advantages and principles of the invention. In the drawings.

DESCRIPTION OF THE PREFERRED EMBODIMENT

Reference will now be made in detail to the present preferred embodiments of the invention, examples of which are illustrated in the accompanying drawings. The matter contained in the description below or shown in the accompanying drawings shall be interpreted as illustrative, not limiting.

Optical switches consistent with this invention provide a curved ridge waveguide heterostructure for receiving and propagating optical signals. These curved ridge waveguides are fabricated using a process that includes an additional etch step to produce a gap in the heterostructure on the inside arc of the curve. This step tightly binds the waveguide without additional masking and regrowth, which would reduce the yield, and prevents signal loss.

Figure 1:
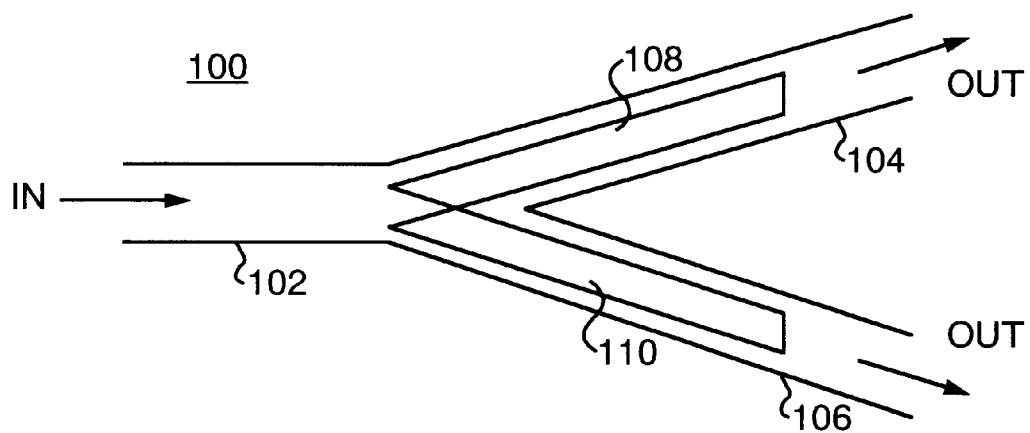
FIG. 1 is a representation of a conventional Y-junction optical switch.

FIG. 1 shows a conventional Y-junction optical switch 100. Switch 100 includes an input branch 102, two output branches 104 and 106. Output branches 104 and 106 contain electrodes 108 and 110, respectively. The refractive index of output branches 104 and 106 are substantially identical. By supplying an electrical current to at least one of the electrodes, however, an asymmetry may be created in the refractive indices. The asymmetry enables the optical switch 100 to operate adiabatically. In other words, light signals in the fundamental and higher even-number modes propagate through the output branch of switch 100 with the higher effective refractive index. Similarly, light signals in the odd-numbered modes propagate through the output branch of switch 100 with the lower effective refractive index. The differences in the refractive indices of output branches 104 and 106 are achieved by forward biasing one output branch, which lowers the refractive optical index by injecting carriers, or reverse biasing the other output branch, which raises the refractive optical index by depleting carriers, or doing both. Thus, if the light signal contains only even or odd modes, the optical switch is intrinsically digital. For example, if the light signal contains only even modes and output branch 104 is forward biased, then the effective refractive index of output branch 104 is relatively lower than the effective refractive index of output branch 106. This causes the even mode light carrier to propagate through output branch 106. Output branch 104 would, therefore, be non-propagating (the "OFF" side of the switch). Similarly, if the light carrier contains only even modes and output branch 106 is reversed biased, then the effective refractive index of output branch 106 is relatively higher than the effective refractive index of output branch 104. Output branch 106 would, therefore, be propagating (the "ON" side of the switch).

One disadvantage to switch 100 is that for it to operate electrical energy must be continually applied to at least one of the electrodes. An additional disadvantage to switch 100 is that during reverse bias operation, the depletion mode suffers from polarization sensitivity. Furthermore, the device may also exhibit problems due to cross-coupling of the electrodes in the junction region.

Figure 2:
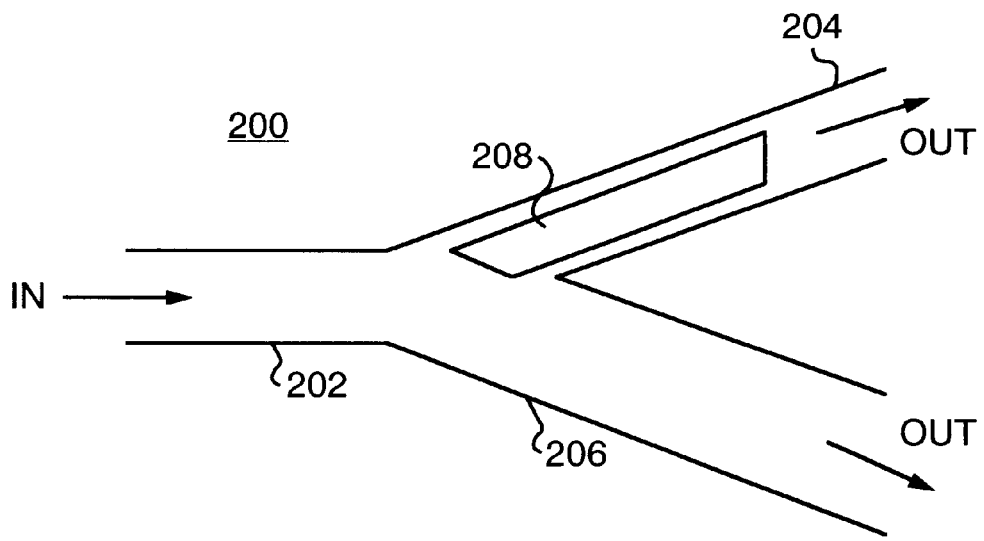
FIG. 2 is a representation of a Y-junction optical switch in accordance U.S. Pat. No. 5,490,226.

FIG. 2 shows a Y-shaped optical switch 200 that is an alternative to the conventional switch 100. Switch 200 includes an input branch 202 and two output branches 204 and 206. Output branches 204 and 206 are designed such that one of the branches has a higher effective refractive index. For example, output branch 206 is designed with an effective refractive index higher than output branch 204. Output branch 204 is designed with an electrode 208.

During un-energized operation, light signals propagate from input branch 202 to output branch 206. However, when electrode 208 is energized to reverse bias output branch 204, the effective refractive index of output branch 204 is increased. The increased effective refractive index causes light signals to propagate from input branch 202 to output branch 204. One of ordinary skill in art would now appreciate the ability to vary the refractive indices in the output branches and rearrange the position of the single electrode to obtain similar results. Switch 200 is further disclosed in U.S. Pat. No. 5,490,226, for ZERO HOLDING POWER DIGITAL OPTICAL SWITCH.

Figure 3:
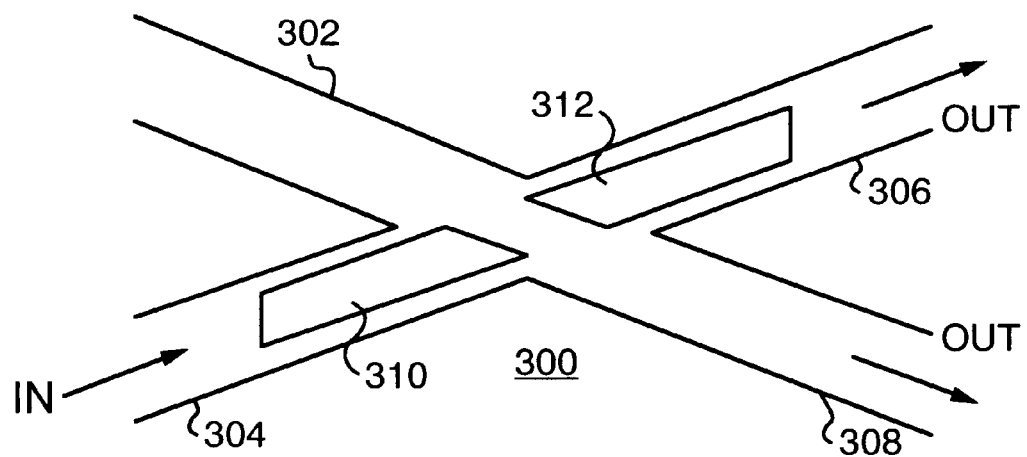
FIG. 3 is a representation of an X-junction optical switch in accordance with U.S. Pat. No. 5,537,497.

FIG. 3 shows an X-shaped optical switch 300 that is an alternative to the conventional switch 100. Switch 300 has two input branches 302 and 304, and two output branches 306 and 308. One of the input branches, input branch 304, and one of the output branches, output branch 306, contain an electrode 310 or 312, respectively. Input branches 302 and 304, and output branches 306 and 308 are designed to have substantially identical effective refractive indices when un-biased, i.e., symmetrical.

If electrodes 310 and 312 are energized with a common bias, either forward or reverse, then, for example, single mode light propagating through input branch 304 would propagate out through output branch 306. Alternatively, if electrodes 310 and 312 are energized with opposite bias, then, for example, single mode light propagating through input branch 304 would propagate out through output branch 308.

Switch 300 operates in this manner because of the following property, when an optical mode enters switch 300 from a particular refractive index input branch it will exit the junction into an output branch with the closest effective refractive index. Thus, light propagating from a relatively high refractive index input branch will tend to exit through the output branch with the relatively higher effective refractive index. Similarly, an optical mode from a relatively lower refractive index input branch will exit the junction through the output branch with a relatively lower refractive index. Thus, when input branch 304 and output branch 306 are both forward biased, they each have a refractive index relatively lower than output branch 308. Similarly, when input branch 304 and output branch 306 are both reversed biased, they each have a refractive index relatively higher than output branch 308. In both these cases, the light signal propagates from input branch 304 to output branch 306 because their refractive indices are relatively closer in value.

Conversely, when input branch 304 is forward biased and output branch 306 is reversed bias, then input branch 304 and output branch 308 have refractive indices relatively lower than output branch 306. Thus, the light signal propagates from input branch 304 to output branch 308. For example, if input branch 304 is forward biased and output branch 306 is reversed biased, then the refractive index of input branch 304 is lowered and the refractive index of output branch 306 is elevated. This causes the effective refractive index of input branch 304 to be lowered relative to output branch 308 and the effective refractive index of output branch 306 to be elevated relative to output branch 308. Because of the biasing, the effective refractive indices of input branch 304 and output branch 308 are more matched than those of input branch 304 and output branch 306. Similarly, if input branch 304 is reversed biased and output branch 306 is forward biased, then input branch 304 and output branch 308 have refractive indices relatively higher than output branch 306. Therefore, light signals propagating through input branch 304 would exit through output branch 308.

Figure 4:
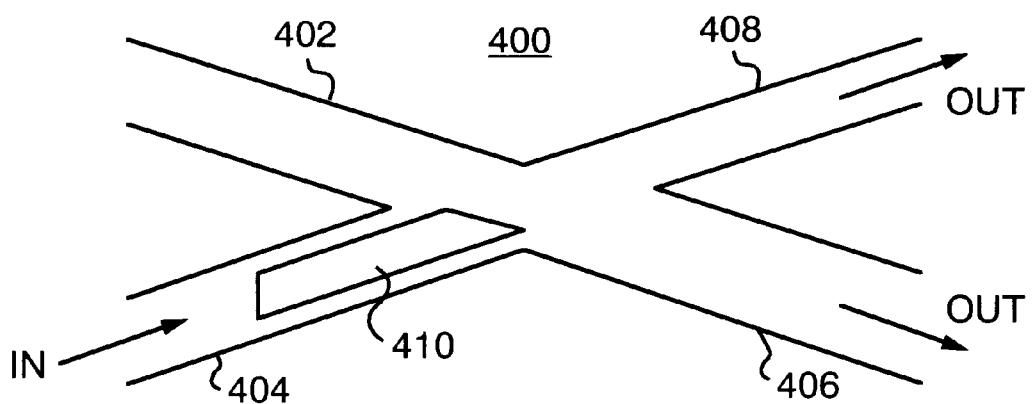
FIG. 4 is a representation of another X-junction optical switch in accordance with U.S. Pat. No. 5,537,497.

FIG. 4 represents an alternative X-shaped optical switch 400. Switch 400 includes two input branches 402 and 404, and two output branches 406 and 408. One of the input branches, input branch 404, contains an electrode 410. Unlike switch 300, switch 400 is designed with output branch 406 having a first refractive index and output branch 408 having a second refractive index that is different than the first refractive index. For example, output branch 406 may be designed with a refractive index higher than the refractive index of un-biased input branch 404, and output branch 408 may be designed with a refractive index lower than the refractive index of un-biased input branch 404.

Accordingly, when electrode 410 is forward biased, which lowers the effective refractive index of input branch 404, light signals propagate from input branch 404 to output branch 408. Similarly, when electrode 410 is reversed biased, which raises the effective refractive index of input branch 404, light signals propagate from input branch 404 to output branch 406. One of ordinary skill in art would now appreciate the ability to vary the refractive indices in the input and output branches and rearrange the positions and number of electrodes to obtain similar results. Switches 300 and 400 are further disclosed in U.S. Pat. No. 5,537,497 for OPTIMIZED ELECTRODE GEOMETRIES FOR DIGITAL OPTICAL SWITCHES.

Figure 5:
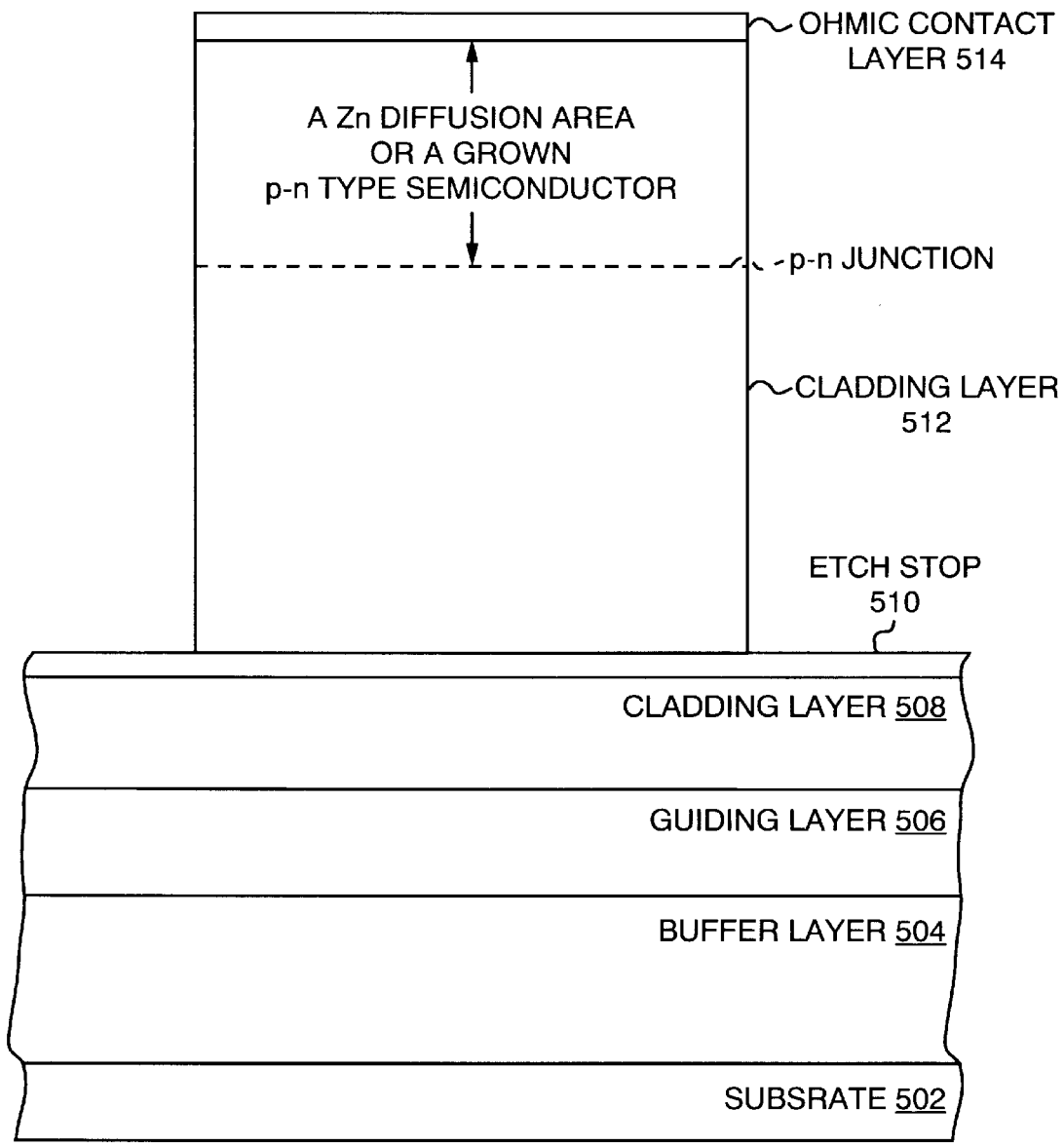
FIG. 5 is a cross-sectional view of an optical index switch consistent with FIG. 2, FIG. 3, and FIG. 4.

FIG. 5 illustrates the epitaxial layering of a ridge waveguide consistent with the present invention. The waveguides comprise a 2.5 $\mu$m to 5.0 $\mu$m wide ridge waveguide positioned to form either a Y-junction or an X-junction. The opening angles at the intersection are between approximately ½° to 2°. At the point where the output waveguides branch, a 1 $\mu$m wide trench is etched to isolate the two distinct ridges. The depth of the p-n junction is a fraction of the ridge height for transverse current confinement. The p-n junctions and the single electrode may extend the complete length of the output branches. Consequently, current is injected well beyond the active switching region and is larger than would be required in an optimized structure. The separation of the waveguides is 150 $\mu$m at the output.

Although the following structure is material specific, one of skill in the art would now appreciate how equivalent materials could be used. The epitaxial layer structure of the switch is grown by either halide VPE, MOCVD, or an equivalent method, on an n⁺—InP substrate 502. An InP buffer layer 504 is deposited on substrate 502 first, followed by a InGaAsP guiding layer 506. Preferably buffer layer 504 is approximately 2.0 $\mu$m and guiding layer 506 is 0.5 $\mu$m Guiding layer 506 is followed by a first InP cladding layer 508, an InGaAsP etch stop layer 510, and a second InP cladding layer 512. Preferably the layers are 0.5 $\mu$m, 0.02 $\mu$m, and 2.5 $\mu$m, respectively. The layers are capped by a InGaAs Layer 514, preferably 0.1 $\mu$m, to facilitate ohmic contact. All of the InP layers are sulphur doped to approximately $1\times10^{17}$ cm$^{-3}$, while the other layers are un-doped.

The p-n junctions in the output branching region of the optical switch is formed by selective area Zn diffusion in closed evacuated ampules using a Si$_3$N$_4$ mask and a ZnP$_2$+P (red) source. The diffusion is conducted at approximately 500° C. for about 15 to 30 minutes, the actual time depends upon the required depth of diffusion. Alternatively, a p-type conductor can be grown in a conventional manner. A combination of reactive ion etching (CH$_4$/H$_2$) and wet chemical etching (H$_3$PO$_4$:HCL=9:1) is used to fabricate the X or Y branching waveguide ridges. A heat-treated polymide layer is applied to planarize the surface, followed by a Ti/Au metal evaporation to form the electrode and contact pads. The substrate is then thinned to approximately 100 $\mu$m, and a Ti/Au back ohmic contact is formed. After sintering the metal contacts at approximately 400° C. for about 20 seconds, the wafer may be cleaved into bars of Y-Junction or X-Junction switches having different branching angles.

For switches 200, 300, and 400 to exhibit adiabatic operation, the opening angle between the input or output branches is small, typically around ½° to 2°. In order to achieve approximately 150 $\mu$m of separation between the ends of the output (or input) branches, these optical switches become relatively long. Separation of around 150 $\mu$m is required to permit coupling of the input or output branches to individual fibers. In order to reduce the length of switches 200, 300, and 400, however, they can be designed with curved input and output branches. The associated electrodes for the curved optical switch are placed consistently with the placement of electrodes 208, 310, 312, and 410.

Curved branches reduce the size of the chip. Conventionally, a weakly bound curved waveguide is manufactured by curving the branches through etching cladding layer 512. This weakly bound curved waveguide, however, experiences signal loss because the light, which tends to travel in a straight path, exits the curved waveguide through the outside arc of the curve. Signal loss in a curved waveguide can be reduced by using a tightly bound curve, which causes the light to bend with the waveguide. However, conventional methods of fabricating a tightly bound curved waveguide require additional masking and regrowth steps to build up cladding layer 512 on the outside arc of the curve. These additional steps reduce yield and significantly increase production and manufacturing costs.

Figure 6A:
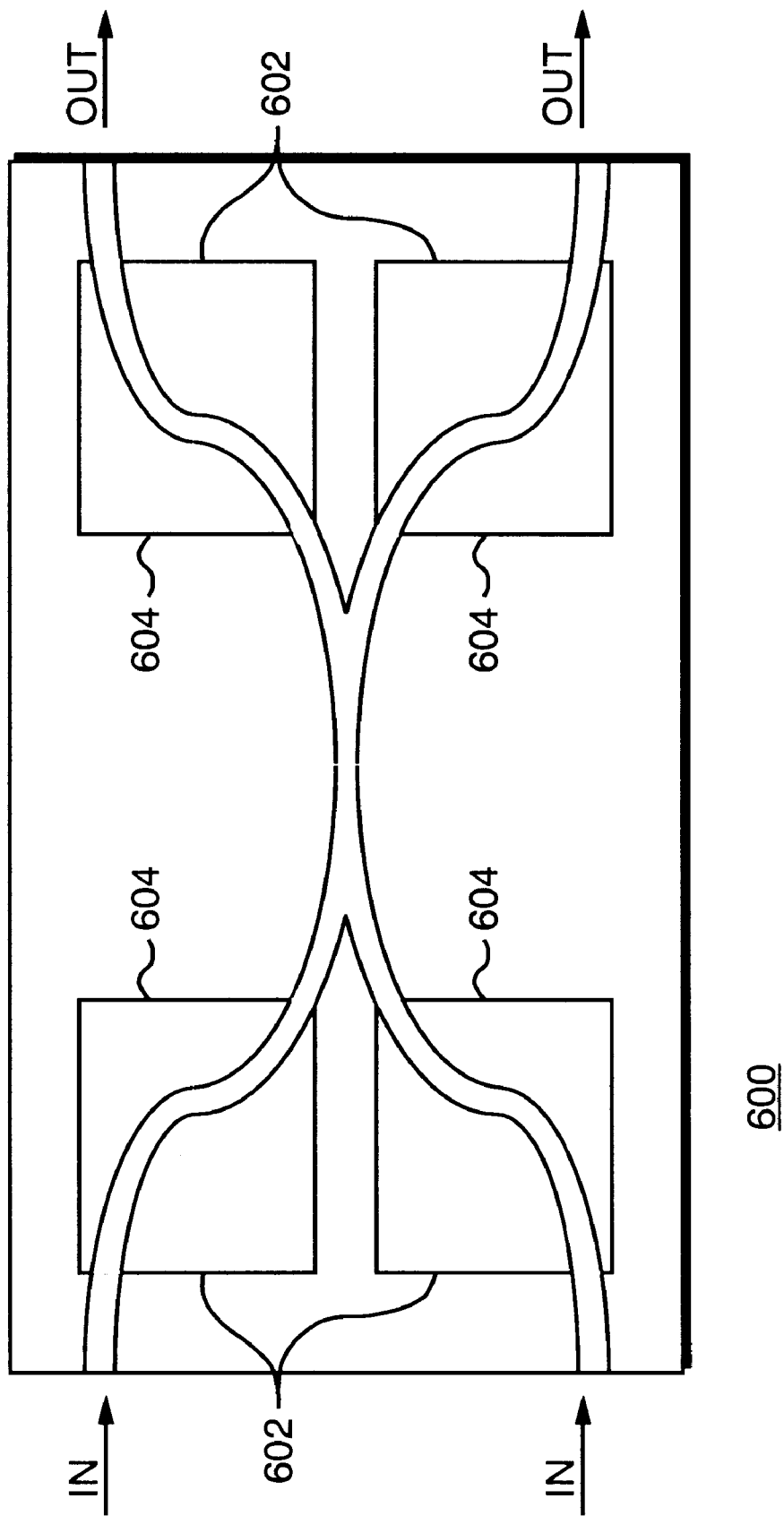
FIG. 6A is a representation of an X-junction optical index switch of FIG. 3 or FIG. 4 including curved input and output branches.
Figure 6B:
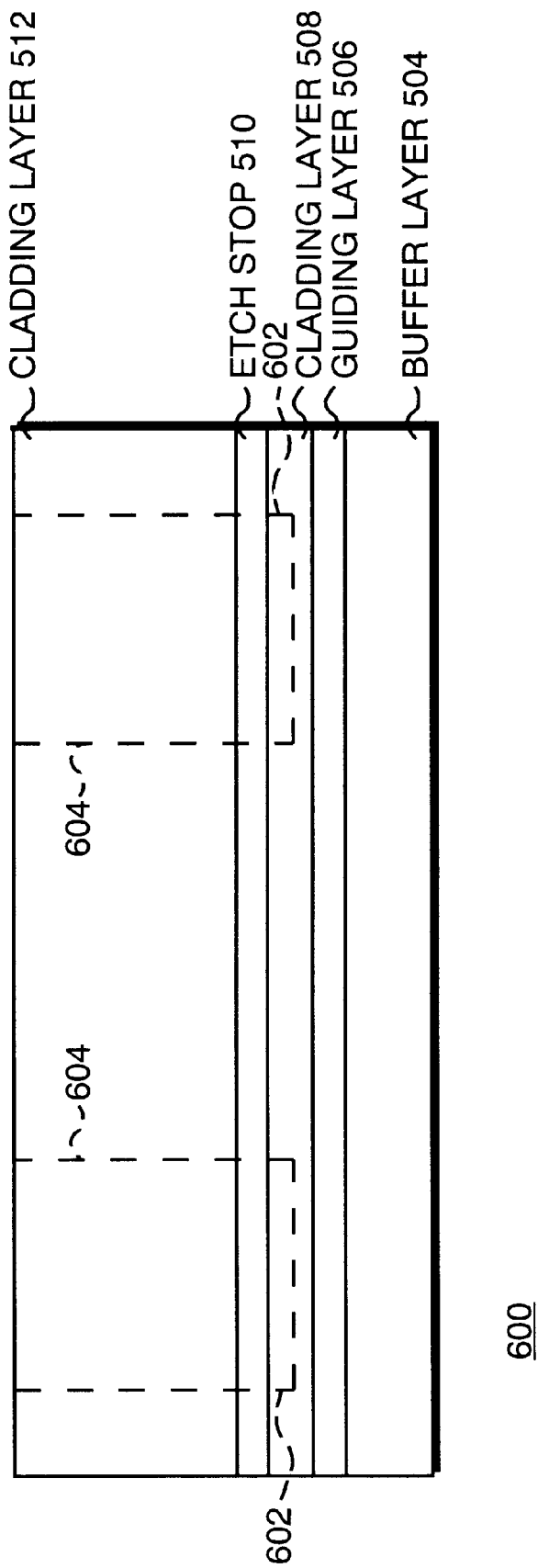
FIG. 6B is a cross-sectional view of the X-junction optical index switch of FIG. 6A showing additional etching.

FIGS. 6A and 6B illustrate an X-junction optical switch 600 consistent with the present invention. To fabricate a tightly bound curved waveguide in a manner consistent with the present invention, the thickness of cladding layer 508 is reduced on the inside arc of the curved ridge waveguide, i.e., area 602, by selectively etching cladding layer 508 after the whole chip is etched in a conventional manner. By etching area 602, the ridge waveguide becomes tightly bound because the effective refractive index of the inside arc of the curve is increased. Because the cladding on the inside of the curve is removed, the light tends to bend instead of exiting the ridge waveguide through area 604. Moreover, etching area 602 produces a tightly bound curved ridge waveguide without the additional masking and regrowth steps of the conventional method. The extra etch also has the advantage that the etch depth need only be controlled to etch at least a threshold minimum depth. Any additional etch provides a tighter bound curved switch.

Although FIGS. 6A and 6B show an X-junction optical switch, a Y-junction optical switch could be similarly modified to have tightly bound curved output branches.

In summary, currently available optical switches require a large chip. In order to reduce the length of these optical switches curved waveguides are placed in the output branches and/or the input branches of the optical switch. The corresponding loss of signal for weakly bound curved waveguides and reduction of yield for tightly bound curved waveguides is avoided by fabricating the chip using an etch step to produce a gap in the heterostructure on the inside arc of the curve. This etch step binds the waveguide without additional masking and regrowth, which reduces the yield, and prevents signal loss.

It will be apparent to those skilled in the art that various modifications and variations can be made in the methods and apparatus consistent with the present invention without departing from the scope or spirit of the invention. Other modification will be apparent to those skilled in the art from consideration of the specification and practice of the invention disclosed herein. The specification and examples should be considered as exemplary only, with the true scope and spirit of the invention being indicated by the following claims.

What is claimed is:

1. An optical switch, comprising:
   an input branch including a ridge waveguide heterostructure for receiving an optical signal;
   a first output branch optically coupled to the input branch at a junction including a curved ridge waveguide heterostructure of a first refractive index;
   a second output branch optically coupled to the input branch at the junction including a curved ridge waveguide heterostructure having a forward-biased refractive index, a reversed-biased refractive index, and an un-biased refractive index each different from the first refractive index; and
   an electrode disposed on the second output branch for altering the refractive index of the second output branch between the forward-biased refractive index, the reversed-biased refractive index, and the un-biased refractive index.

2. The optical switch of claim 1, wherein the input branch, first output branch, and second output branch, comprise:
   an InP substrate;
   an InP buffer layer disposed on the substrate;
   an InGaAsP guiding layer disposed on the buffer layer;
   a first InP cladding layer disposed on the guiding layer and selectively etched around the curved ridge waveguides;
   an InGaAsP etch stop layer disposed on the cladding layer; and
   a second InP cladding layer disposed on the etch stop layer.

3. The optical switch of claim 2, wherein the second cladding layer selectively forms a Zn diffusion area.

4. The optical switch of claim 2, wherein the second cladding layer selectively forms a grown p-type semiconductor.

5. An optical switch, comprising:
   a first input branch including a curved ridge waveguide heterostructure for receiving an optical signal having a first forward-biased refractive index, a first reversed-biased refractive index, and a first un-biased refractive index;
   a second input branch optically coupled to the first input branch at a junction including a curved ridge waveguide heterostructure;
   a first output branch optically coupled to the first input branch at the junction including a curved ridge waveguide heterostructure of a second un-biased refractive index;
   a second output branch optically coupled to the input branch at the junction including a curved ridge waveguide heterostructure having a second forward-biased refractive index, a second reversed-biased refractive index, and a third un-biased refractive index;
   a first electrode disposed on the first input branch for altering the refractive index of the first input branch between the first forward-biased refractive index, the first reversed-biased refractive index, and the first un-biased refractive index; and
   a second electrode disposed on the second output branch for altering the refractive index of the second output branch between the second forward-biased refractive index, the second reversedbiased refractive index, and the third un-biased refractive index.

6. The optical switch of claim 5, wherein the first un-biased refractive index, the second un-biased refractive index, and the third un-biased refractive index are substantially equal.

7. The optical switch of claim 5, wherein the first input branch, the second input branch, the first output branch, and the second output branch, comprise:
   an InP substrate;
   an InP buffer layer disposed on the substrate;
   an InGaAsP guiding layer disposed on the buffer layer;
   a first InP cladding layer disposed on the guiding layer and selectively etched around the curved ridge waveguides;
   an InGaAsP etch stop layer disposed on the cladding layer; and
   a second InP cladding layer disposed on the etch stop layer.

8. The optical switch of claim 7, wherein the second cladding layer selectively forms a grown p-type semiconductor.

9. The optical switch of claim 5, wherein the second cladding layer selectively forms a Zn difflusion area.

10. An optical switch, comprising:
    a first input branch including a curved ridge waveguide heterostructure for receiving an optical signal having a first forward-biased refractive index, a first reversed-biased refractive index, and a first un-biased refractive index;
    a second input branch optically coupled to the first input branch at a junction including a curved ridge waveguide heterostructure;
    a first output branch optically coupled to the first input branch at the junction including a curved ridge waveguide heterostructure of a second un-biased refractive index;
    a second output branch optically coupled to the input branch at the junction including a curved ridge waveguide heterostructure having a third un-biased refractive index different than the second un-biased refractive index;
    a first electrode disposed on the first input branch for altering the refractive index of the first input branch between the first forward-biased refractive index, the first reversed-biased refractive index, and the first un-biased refractive index.

11. The optical switch of claim 10, wherein the first input branch, the second input branch, the first output branch, and the second output branch, comprise:

an InP substrate;

an InP buffer layer disposed on the substrate;

an InGaAsP guiding layer disposed on the buffer layer;

a first InP cladding layer disposed on the guiding layer and selectively etched around the curved ridge waveguides;

an InGaAsP etch stop layer disposed on the cladding layer; and a second InP cladding layer disposed on the etch stop layer.

12. The optical switch of claim 11, wherein the second cladding layer selectively forms a Zn difflusion area.

13. The optical switch of claim 11, wherein the second cladding layer selectively forms a grown p-type semiconductor.

14. A method of manufacturing an optical switch using a semiconductor substrate, comprising the steps of:

applying a cladding on the substrate to form a ridge waveguide heterostructure;

forming a p-n junction by selective area diffusion;

etching the ridge waveguide heterostructure to form a switch junction having a plurality of curved branches, the etching step includes removing cladding at an inside arc of each of the plurality of curved branches;

planarizing the surface of the switch junction; and evaporating a conductive metal to form at least one electrode.

15. The method of claim 14, wherein the re-etching step is controlled to etch a minimum threshold depth of the ridge waveguide.

* * * * *